United States Patent [19]

Chung

[11] Patent Number: 5,494,604
[45] Date of Patent: Feb. 27, 1996

[54] POLYMER-DISPERSED LIQUID CRYSTAL MATERIAL AND PROCESS

[75] Inventor: David B. Chung, Kanagawa, Japan

[73] Assignee: Fujitsu Limited, Kawasaki, Japan

[21] Appl. No.: 163,499

[22] Filed: Dec. 6, 1993

[51] Int. Cl.$^6$ ............................................ C09K 19/52
[52] U.S. Cl. ................................. 252/299.01; 428/1
[58] Field of Search ............................ 252/299.01; 428/1

[56] References Cited

PUBLICATIONS

"Polymer–Dispersed Liquid Crystals" West, pp. 475–495 in Liquid Crystalline Polymers Edit by Weiss & Ober. 1990 ACS Symposium Series 435.

*Primary Examiner*—Philip Tucker
*Attorney, Agent, or Firm*—Skjerven, Morrill, MacPherson, Franklin & Friel; Laura Terlizzi

[57] ABSTRACT

The present invention provides an improved liquid crystal material comprising a liquid crystal material dispersed in a polymer matrix. The polymeric matrix can be a thermal-based system such as an epoxy-based thermal polymeric system or a UV-curable system such as an acrylate-based polymeric system. The polymeric matrix has a crosslinking density which minimizes the driving voltage while maintaining a good contrast ratio. A process using dynamic mechanical analyzer (DMA) testing identifies a $T_g$ and crosslinking density which are employed to determine the optimum degree of crosslinking.

1 Claim, 2 Drawing Sheets

POLYMER-DISPERSED LIQUID CRYSTAL MATERIAL AND PROCESS

FIELD OF THE INVENTION

This invention relates to liquid crystal materials for use in liquid crystal displays and, in particular, to polymer-dispersed liquid crystal materials.

BACKGROUND OF THE INVENTION

Liquid crystal displays are used in-the displays for everything from watches to computer screens and televisions. Most liquid crystal displays use twisted nematic liquid crystal materials. The twisted nematic liquid crystal displays include supertwist, double-supertwist, and monochrome supertwist which "twist" the light from 90 to 270 degrees. In these arrangements, the liquid crystal material is aligned by treating the surface of the substrate to which the material is applied. Usually, the substrate is glass or plastic which has an indium-tin-oxide (ITO) coating.

In twisted nematic liquid crystal displays, a white pixel is on and a black pixel is off. Ambient light passes through a layer of polarized glass (a polarizer) before the light passes into the aligned liquid crystal material. Uncharged nematic crystals, the most commonly used class of liquid crystal material, form a natural helix that twists at an angle which redirects the light so that it passes through a second polarizer. The light makes the pixel look white. When an electric charge is applied to the liquid crystal material, the liquid crystal molecules become aligned, so that the second polarizer no longer passes the light, making the pixel look black. In some liquid crystal displays the order is reversed, so that the pixel is on when the molecules are aligned.

Polymer-dispersed liquid crystal materials are just beginning to be used in display applications. Generally, the process of preparing these materials involves a phase separation in which a homogeneous solution of the polymer or prepolymer and the liquid crystal material is formed and the liquid crystal material later separates out of the solution as the final polymerization or solidification occurs.

The polymer-dispersed liquid crystal displays are advantageous in that the displays provide sufficient contrast to be used in ambient light conditions. In contrast, the twisted nematic liquid crystal displays are more difficult to read in ambient light. In addition to being capable of use in ambient light, the process of manufacturing polymer-dispersed liquid crystal displays is less expensive. The polymer-dispersed liquid crystal material can be simply applied to the substrate without any requirement for alignment as in the twisted nematic displays. In addition, no polarizers are required, further cutting the cost of the displays and increasing the amount of light passing through the material. The polarizers used in twisted nematic displays decrease the amount of light by at least forty percent.

Rather than using aligned liquid crystal materials as in the twisted nematic liquid crystal displays, the liquid crystal material is dispersed in a polymer matrix in which the liquid crystal material is randomly aligned. Therefore, light is scattered through the liquid crystal display when there is no power applied to the display, thereby minimizing the amount of power required to use the display and facilitating good contrast in ambient light conditions.

Although the power requirements are minimized in most liquid crystal displays, the polymer-dispersed liquid crystal displays generally require a driving voltage of sixty to eighty volts. Researchers have tried to lower the driving voltages by controlling the size of the droplets of liquid crystal material dispersed in the polymer matrix. In particular, the driving voltage requirements for some of the polymer-dispersed liquid crystal displays have been reportedly reduced to twenty to thirty volts by varying the droplet size.

Voltage drivers which supply the required driving voltage of sixty to eighty volts, or even twenty to thirty volts, are expensive in comparison to the voltage drivers required for nematic liquid crystal displays. Reducing the driving voltage to closer to the range of the twisted nematic liquid crystal displays (generally below ten volts) would allow wider use of the polymer-dispersed liquid crystal displays, facilitating their use in smaller, portable, battery-operated devices.

SUMMARY OF THE INVENTION

The present invention provides an improved liquid crystal material comprising a liquid crystal material dispersed in a polymer matrix. The polymeric matrix can be a thermal-based system such as an epoxy-based thermal polymeric system or a UV-curable system such as an acrylate-based polymeric system. The present invention utilizes a process of optimizing the crosslinking density of the polymeric matrix, specifically using a dynamic mechanical analyzer (DMA) technique, which minimizes the driving voltage while maintaining the contrast ratio.

A structure of this invention which is useful in a liquid crystal display comprises a first and a second liquid crystal display substrate, each having a coated surface. A liquid crystal material dispersed in a polymer matrix having a crosslinking density which minimizes the driving voltage while maintaining contrast ratio is on the coated surface of said first substrate and the coated surface of the second substrate which contacts the polymer matrix.

DESCRIPTION OF THE INVENTION

Figure 1:
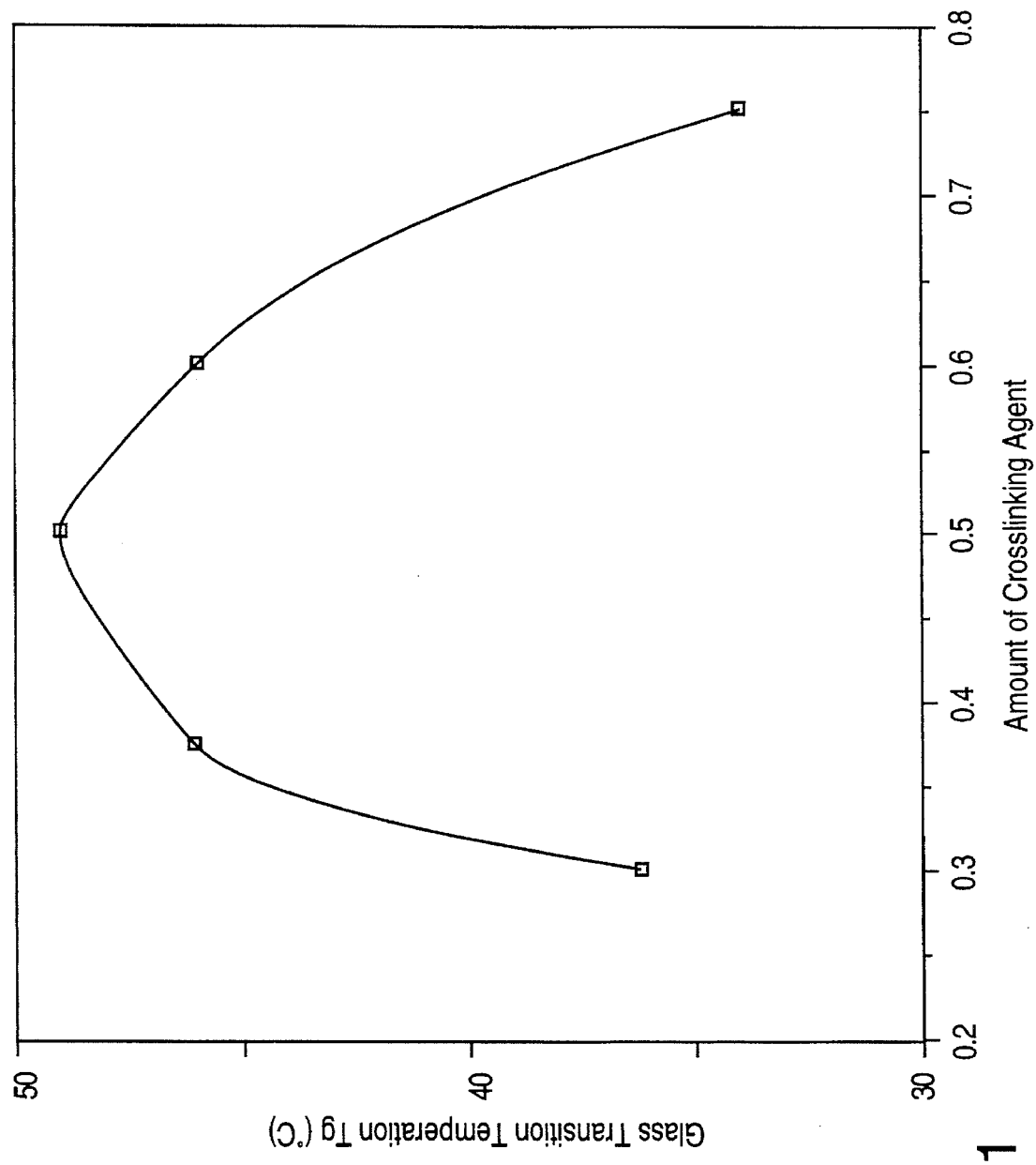
FIG. 1 illustrates the relationship of the amount of crosslinking agent (X axis) to the glass transition temperature ($T_g$) of the cured polymer, which is indicative of the degree of crosslinking of the polymer.

The present invention provides an improved polymer-dispersed liquid crystal material which, when used in a liquid crystal display, can be driven by a voltage as low as seven volts while displaying good contrast and supporting a line width of 0.25 mm. The polymer-dispersed liquid crystal material comprises liquid crystals dispersed in a polymer matrix. The crosslinking density is optimized for values including the stoichiometric ratio of the polymer to the crosslinking agent and for a range of excess polymer and excess crosslinking agent. It has now been found that using non-stoichiometric ratios of the polymer and crosslinking agent, preferably an excess of the crosslinking agent over the stoichiometric value, in thermal polymeric systems provides a crosslinking density which minimizes the driving voltage while maintaining acceptable electro-optical properties. Alternatively, in UV-curable system, a similar result can be achieved by controlling the degree of crosslinking which can be achieved by controlling factors such as the UV exposure.

The Polymer

The liquid crystal material can be dispersed in any polymer suitable for use in prior art displays. To be suitable, the polymer must have an adequate $T_g$ so that the polymer remains solid at normal operating temperatures. However, the $T_g$, which is a measure of toughness or rigidity, is close to room temperature to provide a polymer of the desired degree of flexibility. The polymer is preferably sufficiently flexible to be suitable for use on a flexible substrate such as a plastic sheet without cracking.

The monomers which form the polymer are relatively long. The length of the monomer between reactive groups which can participate in crosslinking determines the size of the spaces in the final polymer in which the liquid crystal material resides. The spaces must be of adequate size so that their size does not restrict re-orientation of liquid crystal molecules when a field is applied.

Short monomers form small spaces which increase the driving voltage. Therefore, the final polymer must contain sufficiently large spaces so the size does not restrict liquid crystal molecule alignment. The monomer size and the degree of crosslinking of the polymer must be controlled to provide the desired volume spacing.

In addition, the polymer must have desirable optical properties (i.e., the polymer must be transparent). That is, the index of refraction of the polymer must be the same as or sufficiently similar to the refractive index of the substrate and that of the liquid crystal material to be transparent.

In one preferred embodiment, the polymer is formed in a thermal based system in which a prepolymer is polymerized with a crosslinking agent using heat to form the final polymer. An exemplary preferred thermal-based resin system is an epoxy-based thermal polymeric system. Although the polymer is exemplified herein by an epoxy-based polymer, UV-curable systems including acrylic polymers such as epoxy-acrylate, polyurethane acrylic and other acrylic polymers, are also suitable for use in the invention.

With UV-curable polymers, the prepolymer is UV cured using a photoinitiator as a catalyst. Suitable photoinitiators for use with acrylate-based polymers are well known and include IRGACURE photoinitiator (catalog no. 184) and DAROCUR photoinitiator (catalog no. 1173), both from Ciba Geigy. The rate of polymerization is controlled by the selected monomer and the UV light intensity. The degree of crosslinking is controlled by the length and intensity of the UV light exposure. In general, a photoinitiator absorbs UV light and produces a radical initiator. The radical initiator induces a chain reaction polymerization. The reaction is terminated by a radical-radical coupling process.

The epoxy resins are among the most important commercial non-vinyl polymers. The epoxy resins are a type of polyether prepared by a step polymerization reaction between an epoxide and a dihydroxy compound, usually bisphenol, in the presence of a base. The polymerization sequence involves formation of a low molecular weight prepolymer which is capable of undergoing further polymer polymerization through either terminal epoxide groups or pendant hydroxyl groups present in the prepolymer. The most common dihydroxy compound in use is bisphenol-A which produces a prepolymer with varying number of pendant hydroxy groups depending on the polymerization conditions.

The prepolymer is further polymerized with a crosslinking agent using heat to form a crosslinked high polymer in a curing process. The rate of polymerization is basically controlled by the curing temperature and the relative concentration of the materials.

The prepolymer

Preferably, the polymer is made of two or more prepolymers having different final viscosities. The first prepolymer is preferably a general purpose prepolymer which is liquid at room temperature. The first prepolymer preferably provides a viscosity in the final resin in the range of from about 4 to about 9 poise.

The second prepolymer is preferably a prepolymer which provides increased flexibility to the final resin. Preferably, the second prepolymer provides a viscosity in the final resin in the range of from about 110 to about 150 poise.

Use of a single prepolymer resin of intermediate viscosity does not provide the same characteristics. Specifically, it is believed that the polymers formed from use of the two prepolymers of different viscosities is superior in that the resultant cured polymer has the required rigidity provided by the short repeating units. However, the polymer also has larger open spaces provided by the larger repeating unit which permit liquid crystal material to move and change orientation while dispersed in the polymer.

Preferably the ratio of the weight of the high viscosity prepolymer to that of the low viscosity prepolymer is from about 40 to about 60%. More preferably, the ratio is from about 45 to about 55%. Most preferably, substantially equal weights of the prepolymers are used.

Preferably, the first epoxy prepolymer is a bisphenol-A liquid resin and the second is a diglycidyl ester epoxy resin. A most preferred prepolymer combination is EPON resin 828 and EPON resin 871. EPON resins are liquid epoxy resins which are commercially available from Shell Chemical Co. EPON resin 828 is a non-diluted bisphenol A resin which affords a moderate viscosity at room temperature. According to the manufacturer, EPON resin 828 is the most widely accepted general purpose epoxy resin for most casting applications due to its balance of handling characteristics and end performance properties.

EPON resin 871 is a diglycidyl ester epoxy resin which is designed for increased flexibility and resistance to thermal shock. EPON resin 871 is an aliphatic resin which can be blended with conventional bisphenol resins in all proportions to produce varying degrees of flexibility and resistance to thermal shock. Various properties of the resins are illustrated below.

| Resin | Viscosity[1] | EEW[2] | Color[3] | Weight[4] |
|---|---|---|---|---|
| EPON 828 | 110–150 | 185–192 | 3 | 1162 (9.7) |
| EPON 871 | 4–9 | 390–470 | 12 | 982 (8.2) |

[1] ASTM D-445 at 25° C. in poise
[2] grams of resin containing one gram-equivalent of epoxide (using perchloric acid method)
[3] Gardner, maximum
[4] kg/m$^3$ (lb/gal)

The Crosslinking Agent

The epoxy-based prepolymer is cured in the presence of a crosslinking agent. The crosslinking agents used with the polymer do not differ from those of the prior art. Therefore, any crosslinking agent which is suitable to produce a polymer having the desired characteristics can be used in the present invention. In particular, the crosslinking agent should be an agent which produces a flexible, rather than a rigid, material.

For use with epoxy-based polymers, carboxylic acid anhydrides and amines (including diamines and polyamines) are most commonly used crosslinking agents. Amines are preferred. Reactions with amines are exothermic and are catalyzed by proton donors.

A preferred amine crosslinking agent has a low viscosity and is designed for use with epoxy resins to give tough chemical resistant coatings. A most preferred amine crosslinking agent is sold under the tradename VERSAMID 150 by Henkel. VERSAMID 150 resin is a low viscosity, polyamide resin based on dimerized fatty acid and polyamines. Properties of VERSAMID 150 resin are illustrated below.

| Amine Value[1] | AEW[2] | Viscosity[3] | Color[4] | Weight[5] |
|---|---|---|---|---|
| 370–400 | 20–40 | 30 | 8 | 8 |

[1]mg KOH/g resin
[2]theoretical amino hydrogen equivalent weight
[3]poise at 25° C.
[4]Gardener, maximum
[5]lb/gal A most preferred prepolymer/curing agent combination is an epoxy-polyamine polymer which is used as exemplary to illustrate the present invention.

The stoichiometric ratio by weight of the two prepolymers to that of the crosslinking agent is from about 2.0:0.75 to about 2.0::1.0. The ratio of the weights of the prepolymers to that of the crosslinking agent used to give the desired degree of crosslinking is from about 2.0:4.0 (1.0:2.0) to about 2.0:3.0, preferably 2.0:3.5.

A degree of crosslinking that minimizes driving voltage while providing an acceptable contrast ratio can be readily determined for any polymeric system. In particular, for thermal-based systems, stoichiometric ratios of the polymer and the crosslinking agent provide complete crosslinking as indicated by the highest $T_g$ value for the polymer. Ratios of the weights of the polymer and crosslinking agent wherein either the amount of the crosslinking agent or the polymer is greater than the stoichiometric ratio, each provide less than complete crosslinking. Those cured polymers are prepared without liquid crystal material in determining the $T_g$ values of optimal composition.

Of the polymers which have $T_g$ values which are suitable for the application, the same composition of precured polymers is mixed with the liquid crystal material (usually about 60% by weight of the liquid crystal material) is also sandwiched between ITO-coated substrate plates. Following cure of the sandwiched polymeric liquid crystal material, the contrast and the driving voltage of each cured polymeric liquid crystal film is determined. The cured polymeric liquid crystal film with the best contrast is determined and, of those cured polymeric liquid crystal films with the best contrast, the film having lowest driving voltage is selected.

As demonstrated in the Examples, the DMA technique unequivocally determined that the $T_g$ of the composition with the best contrast and lowest driving voltage was below that of the composition having the amounts of the polymer and crosslinking agent which were closest to the stoichiometric ratio. This means that the optimum system has a lower crosslinking density than that of the fully crosslinked (or stoichiometric) sample.

The appropriate degree of crosslinking can also be determined for UV-curable systems by controlling the UV exposure of the polymer.

As stated above, preferably an excess amount of the crosslinking agent, above the amount for the stoichiometric value is used. For the epoxy-based polymers, preferably the excess amount of crosslinking agent is from about 30 to about 70% over that of the stoichiometric value, more preferably from about 50 to about 65% of the stoichiometric value. That is, about 130 to about 170% of the stoichiometric value of the crosslinking agent is used.

When excess polymer (or insufficient crosslinking agent is used, there is a direct relation between the amount of the crosslinking agent and the degree of crosslinking, as evidenced by the $T_g$ of the cured polymer which is illustrated in FIG. 1. As stated previously, the stoichiometric ratio of the polymer and crosslinking agent provide a fully crosslinked polymer. When excess crosslinking agent is used, a similar relationship to the $T_g$ value is present. However, as can be seen in the figure, when the amount of crosslinking agent versus the $T_g$ of the cured polymer is graphed, the resultant bell shaped curved is not perfectly symmetrical. Once the peak of the bell shaped curve is reached at the highest $T_g$ (and the stoichiometric ratio of crosslinking agent) the curve is somewhat extended, indicating that a percentage of excess crosslinking agent gives a lower crosslinking density due to the competition of available reactive sites by an excess amount of crosslinking agent.

Therefore, these excesses of crosslinking agent produce a cured polymer which is from about 30 to about 70% crosslinked, preferably 40 to 50% crosslinked (with 100% being the fully crosslinked polymer produced using stoichiometric values of the polymer and crosslinking agent).

The Liquid crystal Material

The liquid crystal material of this invention does not differ from that of prior art polymer-dispersed liquid crystal materials. A liquid crystal material is an organic compound which possesses an intermediate or mesomorphic state between solid and liquid. Liquid crystal materials are turbid liquids in appearance which, when heated, become isotropic, transmitting light equally in all directions. The sequence is reversed when the liquid crystal material is cooled.

Liquid crystals have a linear molecular structure. Liquid crystal materials which are suitable for use in the invention can be smectic, cholesteric, or nematic. Suitable liquid crystal materials have a room temperature nematic phase. Nematic liquid crystal materials are used as exemplary herein.

Preferred nematic liquid crystals are mixtures of different homologs of cyanobiphenyl derivatives and include alkyl derivatives, preferably with from 3 to 12 carbons, such as p-propyl cyanobiphenol, p-butyl cyanobiphenol, and alkoxy derivatives, preferably with from 3 to 12 carbons, such as p-butoxy cyanobiphenol, and p-hexoxy cyanobiphenol. Alkyl and alkoxy cyanobiphenyl derivatives having from 3 to 12 carbons and mixtures thereof are commercially available from a variety of sources including E. Merck Industries. A most preferred liquid crystal material is the nematic liquid crystal material sold under the designation EM E7 (E. Merck Industries). The material is a mixture of families of homologs of cyanobiphenyl liquid crystals which possess a room temperature nematic phase.

The liquid crystal material is added to the prepolymer-crosslinking agent mixture in an amount of from about 55 to about 65, more preferably, about 60% by weight based on the total weight of the prepolymer-liquid crystal material mixture.

The Spacer

The polymer-dispersed liquid crystal material preferably also contains a spacer, A spacer is a material that provides the desired spacing between the substrates. Suitable spacers do not interfere with the resins and liquid crystal material and are optically transparent. The spacer provides a thickness of the polymer-dispersed liquid crystal material with a depth defined by the size of the spacer. Spacers are commercially available as spheres or short rod-like fibers of uniform size from a variety of sources. Spacers are made of glass or hard polymeric materials such as nylon. The size of the spheres or the rods is the same as the desired distance between the substrates and is sufficient to prevent contact between the substrates. In general, the size of the spacer is from about 10 to about 50 µm, preferably about 15 to about 25 µM. Of course, spacers of a uniform size are used in a given display. A most preferred spacer is 15 µM transparent glass fibers commercially available from E. Merck Industries.

The spacer is added to the prepolymer-crosslinking agent-liquid crystal material mixture in an amount sufficient to maintain substantially uniform distance between the two substrates. The amount of spacer is not critical and generally is less than 15%. Preferably, about 5% by weight of the spacer based on the total weight of the prepolymer-liquid crystal material mixture.

Preparation of the Polymer-Dispersed Liquid Crystal Display

The polymer-dispersed liquid crystal material of this invention is prepared by mixing the crosslinking agent with the prepolymer resins which form the cured polymer. The mixing is conveniently performed in a blender at room temperature to form a first mixture. When the resins are mixed, the first mixture is degassed. Following degassing, the liquid crystal material and a spacer are added and mixed to form a second mixture.

The second mixture is degassed and then applied as a thin film to cover a desired surface. The film can be formed by any known method. Conveniently, the film is formed by placing a portion of the second mixture on the surface of a substrate and drawing down the mixture using a glass or metal rod, as in standard thin coating techniques. Once the surface is coated, the second substrate is placed on the coating and the substrates are squeezed together so that excess mixture is forced out and the coating is the thickness of the spacer.

The polymer-dispersed liquid crystal material is then cured. Epoxy-based polymers are thermally cured. Generally, the polymer is cured at a temperature of from about 60° to about 90° C. for from about 2 to 5 hours. Preferably the polymer-is cured at a temperature of about 70° C. for about 3 hours.

A Display

A structure useful in a polymer-dispersed liquid crystal display of this invention comprises a generally planar substrate having a generally planar surface. The substrate functions as a support for the polymer-dispersed liquid crystal material. The substrate is transparent and can be glass or plastic. The substrate does not differ from prior art substrates used with polymer-dispersed liquid crystal material displays. The substrate can be either rigid or flexible.

The surface of the substrate is coated with an indium titanium oxide (ITO) coating or any other transparent metallic coating that can be used to provide the required electric field to turn the display on and off. The ITO-coated substrates do not differ from those of the prior art. Preparation of ITO coatings and ITO-coated substrates is well known. In addition, ITO-coated substrates are commercially available from a variety of sources including Donally Inc., a Michigan company which sells ITO-coated glass substrates, and Courtaulds Performance Film, Inc., a California company which sells ITO-coated polymeric substrate films.

The ITO coating applied to the surface of the substrate is etched to form a plurality of ITO-coated strips. Pixels in the display are formed by the relationship of the ITO-coated regions on the first substrate to those on the second substrate. For example, the first plate can have ITO strips in the X direction and the second plate can have ITO strips in the Y direction (i.e., rotated 90° from the first plate) to form so called pixels, a picture element in dot matrix format.

The polymer-dispersed liquid crystal material is applied to and covers the ITO-coated surface of the substrate, as described above. A second substrate having an ITO-coated surface covers the polymer-dispersed liquid crystal material with the ITO-coated surface contacting the polymer-dispersed liquid crystal material.

The novel polymer-dispersed liquid crystal material of this invention has been fully described. This novel material can be utilized in a polymer-dispersed liquid crystal display and so the remaining parts thereof do not differ from those of the prior art, are well known and therefore are not described herein.

Figure 2:
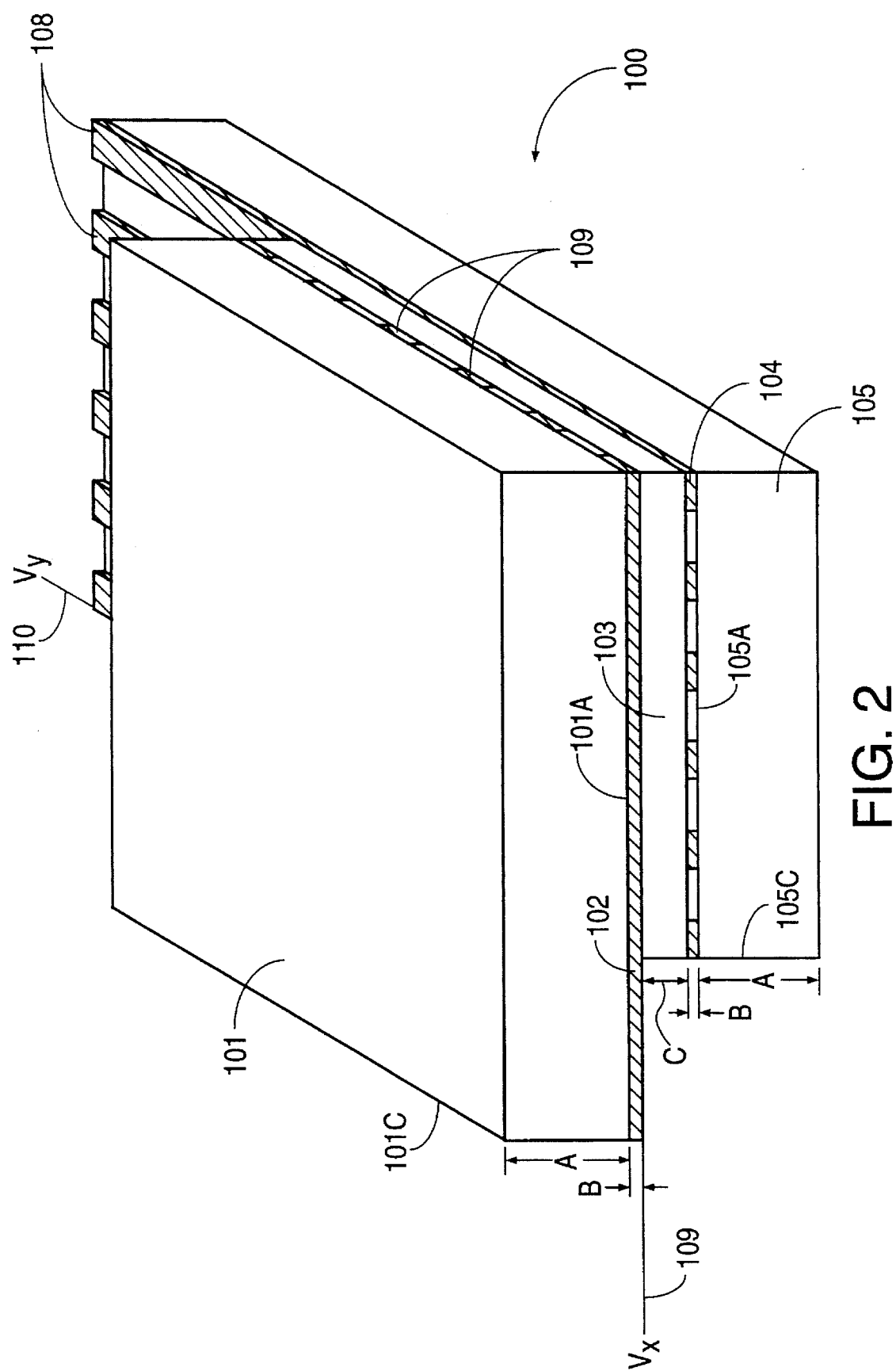
FIG. 2 illustrates a perspective view of a structure useful in a polymer-dispersed liquid crystal display.

A preferred polymer-dispersed liquid crystal display structure, display 100, is illustrated in FIG. 2. In FIG. 2, the thickness of the layers in relation to the length and width of the layers and the width of strips 108 and 109 are not drawn to scale. Substrates 101 and 105 are illustrated as having substantially rectangular Surfaces. Square surfaces are also suitable. In addition, substrates 101 and 105 are aligned so that the long sides of the substrates are at about 90° to each other and an end of each substrate extends past an edge surface of the other substrate; e.g., end 101C of substrate 101 extends past edge surface 105C of substrate 105. However, in other embodiments, the substrates can be aligned so that their surfaces are substantially coplanar.

In FIG. 2, ITO-coating layer 104 on surface 105A of substrate 105 is etched to form strips 108. Similarly, ITO-coating layer 102 on surface 101A of substrate 101 is etched to form strips 109. Polymer-dispersed liquid crystal material layer 103 is sandwiched between surface 105A and surface 101A to form display structure 100 of this invention. The ITO-coated strips of layer 102 are at about a 90° angle; i.e., perpendicular, to those of layer 104. In the embodiment in the drawing, substrates 101 and 105 have the same thickness A. Similarly, ITO-coating layers 102 and 104 have the same thickness B. However, those of skill in the art would understand that thickness A of substrate 101 would not have to be the same as that of substrate 105 and can be selected for the particular application as required. Thickness B of ITO-coating layers 102 and 104 can vary in a similar manner.

Leads 110 and 111 are connected to strips 108 and 109, respectively, which in turn are connected to a voltage driver that applies voltage $V_x$ in the X direction and $V_y$ in the Y direction across display 100.

This invention is further illustrated by the following specific but non-limiting examples. Procedures which are Constructively reduced to practice are described in the present tense, and procedures which have been carried out in the laboratory are set forth in the past tense.

EXAMPLE 1

Preparation of Polymer-Dispersed Liquid Crystal Material

A preferred polymer-dispersed liquid crystal material was prepared as described below.

10 gm of EPON 825 resin (Shell Chemical Co.), 10 gm of EPON 871 resin (Shell Chemical Co.), and 7.5 gm of VERSAMID 150 resin (Henkel) were mixed by blending in a beaker at room temperature to form a first mixture. The first mixture was degassed.

Following degassing, 4.0% by weight of the prepolymer-crosslinking agent mixture and 60% by weight of EM E7 liquid crystal material (E. Merck Industries) and 5% by weight of 20 μM diameter glass bead spacers (E. Merck Industries) were mixed to form a second mixture. The second mixture was degassed and a film of about 400 μm was applied to an ITO-coated substrate from Courtaulds Performance Film, Inc (4 inch by 6 inch substrate having a 0.25 mm width ITO strips). A second ITO-coated substrate was placed over the film with the ITO-coated side on the film and pressed to squeeze out the excess film to form a film the thickness of the spacer.

The sandwiched polymer-dispersed liquid crystal material was then oven cured at a temperature of 70° C. for 3 hours.

EXAMPLE 2

Analysis of Polymer-Dispersed Liquid Crystal Material

A device having polymer-dispersed liquid crystal material prepared as described in Example 1 was tested. The saturation driving voltage of the material was 7 volts at 60 Hz. The material also provided good contrast.

EXAMPLE 3

Relationship of Degree of Crosslinking to Saturation Driving Voltage Liquid Crystal Material Polymer-dispersed liquid crystal material displays were prepared as described in Example 1 using different weight ratios of the prepolymer to the crosslinking agent. The weight ratios of the prepolymer to the crosslinking agent tested were 1:0.11; 1:0.19; 1:0.3; 1:0.4; 1:0.5; 1:0.6; 1:0.75; 1:2.0; and 1:2.5.

Following curing, the displays were tested for saturation driving voltage and their optical characteristics were evaluated. The lowest saturation driving voltage was less than 7 volts at 60 Hz for the sample having a 1:2.0 ratio. However, the contrast was low. The saturation driving voltage was less than 7 volts at 60 Hz for the sample having a 1:1.5 ratio. This display provided suitable contrast. Samples with a ratio of 1:0.11 and 1:2.5 had poor contrast.

This study demonstrated that the relationship between the saturation driving voltage and the amount of curing agent is that samples with stoichiometric ratios (1:0.4 and 1:0.5) have the highest saturation driving voltage. Data from the dynamic mechanical analyzer (DMA) showed that the amount of crosslinking is the highest at the component ratio closest to the stoichiometric ratio of polymer to crosslinking agent. At the stoichiometric ratio, the $T_g$ value (glass transition temperature value) is highest from DMA data. $T_g$ values are related to the amount of crosslinking or the crosslinking density of polymeric materials. When the polymeric composition had an amount of crosslinking agent which was either less than the stoichiometric value or greater than the stoichiometric value, the $T_g$ value was decreased, indicating that the polymer was less than completely crosslinked.

This study further demonstrates that one can use either excess polymer (insufficient crosslinking agent) or excess crosslinking agent to produce the degree of crosslinking which provides a low driving voltage material with good contrast.

What is claimed is:

1. A method of making a liquid crystal polymeric material comprising a liquid crystal material dispersed in a polymeric matrix selected from the group consisting of epoxy-based polymer and an acrylate-based polymer, said method comprising:

(a) mixing crosslinking agent with the polymeric material to form a prepolymer, the ratio of polymeric material to crosslinking agent being less than or greater than the stoichiometric ratio thereof;

(b) degassing the prepolymer to form a degassed prepolymer;

(c) adding liquid crystal material and a spacer to the degassed prepolymer form a mixture;

(d) degassing the mixture to form a degassed mixture;

(e) applying the degassed mixture as a thin film; and (f) curing said thin film to form said liquid crystal polymeric material.

* * * * *